(12) United States Patent
Gotoh et al.

(10) Patent No.: US 8,521,466 B2
(45) Date of Patent: Aug. 27, 2013

(54) METHOD AND DEVICE FOR DETERMINING INTERFACE PARTICLE USED IN PARTICLE METHOD, AND PROGRAM FOR DETERMINING INTERFACE PARTICLE

(75) Inventors: Hitoshi Gotoh, Kyoto (JP); Abbas Khayyer, Kyoto (JP)

(73) Assignee: Kyoto University, Kyoto (JP)

( * ) Notice: Subject to any disclaimer, the term of this patent is extended or adjusted under 35 U.S.C. 154(b) by 239 days.

(21) Appl. No.: 13/119,197

(22) PCT Filed: Sep. 8, 2009

(86) PCT No.: PCT/JP2009/065655
§ 371 (c)(1),
(2), (4) Date: Mar. 16, 2011

(87) PCT Pub. No.: WO2010/032656
PCT Pub. Date: Mar. 25, 2010

(65) Prior Publication Data
US 2011/0172948 A1 Jul. 14, 2011

(30) Foreign Application Priority Data
Sep. 18, 2008 (JP) ................................ 2008-239690

(51) Int. Cl.
*G01N 9/36* (2006.01)
*G06F 19/00* (2011.01)

(52) U.S. Cl.
USPC .................................. 702/137; 702/95; 703/2

(58) Field of Classification Search
USPC ............... 702/12, 50, 95, 100, 137; 73/32 R; 356/300; 703/2, 9
See application file for complete search history.

(56) References Cited

U.S. PATENT DOCUMENTS
7,430,500 B2 * 9/2008 Lei et al. ........................ 703/9

FOREIGN PATENT DOCUMENTS
JP 07-334484 12/1995
JP 2008-111675 5/2008

OTHER PUBLICATIONS

Hitoshi Gotoh et al, "MPS-ho ni yoru ... no Kairyo" Proceedings of Coastal Engineering, JSCE, Oct. 10, 2003, vol. 50, pp. 21-25.
Seiichi Tsukakoshi, "Ryushiho ni ... Suchi Kaiseki" Nagare, Jun. 25, 2002, vol. 21, No. 3, pp. 230-239.
Y. Qin et al., "Combination of the Reproducing Kernel Particle Boundary Element-Free Method and the Finite Element Method for Elasticity", Chinese Journal of Solid Mechanics, vol. 29, No. 2, Jun. 2008, pp. 205-211.
R. Duan et al., "Direct Simulation of Interfacial Flows for Multi-Phase and Multi-Component Mixtures Using the Particle Method", J. Tsinghua Univ (Sci & Tech), 2005, vol. 45, No. 6, pp. 835-838.

* cited by examiner

*Primary Examiner* — John H Le
(74) *Attorney, Agent, or Firm* — Clark & Brody

(57) ABSTRACT

A method for determination of interface particles used in a particle method is proposed. According to the present invention, the method for determination includes a density acquiring step of acquiring density in a predetermined range based on a determining-target particle, a first discriminating step of comparing the density with a predetermined threshold, a second discriminating step of determining a symmetry of an arrangement of the other particles within a predetermined range based on the determining-target particle, and a determining step of determining the determining-target particle as an interface particle in the case that the density determined by the first discriminating step is found to be smaller than the predetermined threshold and the arrangement of the other particles determined by the second discriminating step is found to be asymmetrical.

3 Claims, 7 Drawing Sheets

Time history of pressure measured at Point P

METHOD AND DEVICE FOR DETERMINING INTERFACE PARTICLE USED IN PARTICLE METHOD, AND PROGRAM FOR DETERMINING INTERFACE PARTICLE

TECHNICAL FIELD

The present invention is related to a method and a device for determination of interface particles used for determining particles positioned in an interface of a fluid or the like, at the time of analyzing a behavior of the fluid or a pulverulent material (hereinafter, referred to as "fluid or the like") by using a particle method, and a program for determining the interface particles.

BACKGROUND ART

Conventionally, there have been known a grid method and a particle method as a method for analyzing a behavior of a fluid or the like. Among them, the grid method is a method for determining a velocity, a pressure and other characteristics of the fluid or the like in each of grid positions by covering a region to be analyzed by a grid, and various methods such as a difference method, a finite element method, and a finite volume method exist. In the grid method, however, it is hard to deal with a large deformation such as a splash of a free surface (interface), and the grid method includes such a defect that a complicated work to prepare a grid in the subject domain is necessary.

On the contrary, the particle method expresses the fluid or the like as an assembly of particles, and analyzes a behavior of the fluid or the like by calculating a mutual action between the particles. Accordingly, the particle method does not require a grid generation which is carried out in the grid method, and has an advantage of handling large deformations of the free surface comparatively easily.

In this case, as the particle methods, there have been known an SPH method for calculating a behavior of a compressible fluid in accordance with an explicit scheme and a MPS method for calculating a behavior of an incompressible fluid in accordance with a semi-implicit scheme. A technique related to the latter is known by the following PTL 1 and PTL 2. Further, there has been known an ISPH method which can analyze the incompressible fluid by introducing an algorithm of the semi-implicit scheme to the SPH method, without introducing an artificial viscosity.

In the case of analyzing the behavior of an incompressible fluid by using the particle method, particularly the MPS method, a particle number density in a predetermined reference radius (within a reference range) based on one particle in the fluid takes a fixed value, under an incompressible condition. Accordingly, in the MPS method, the behavior of the fluid is analyzed by correcting a velocity and a position of the particle in such a manner that the particle number density always takes a constant value.

Further, in the MPS method, in order to determine whether or not a particle is positioned on an upper surface (a free surface; an interface) of a fluid, it is determined whether or not a particle number density $n_i$ at a position of the particle satisfies a condition of the following equation (1) with respect to a fixed value $n_0$.

$$n_i < \beta n_0 \quad (1)$$

(where, $\beta$ is a model constant (recommended value $\beta=0.97$))

On the other hand, in the SPH method, in the case that density $\rho_i$ of a fluid, in place of the particle number density $n_i$, satisfies a condition of the following equation (2) with respect to a fixed value $\rho_0$, it is determined that the particle is a particle which is positioned on the free surface.

$$\rho_i < \beta \rho_0 \quad (2)$$

(where, $\beta$ is a model constant (recommended value $\beta=0.99$))

In the case of the incompressible fluid, since the particle number density in the reference range is in proportion to the density of the fluid, approximately the same determination is carried out by Equation (1) and Equation (2).

However, there are cases that a particle which is not a particle positioned on the free surface (i.e., a particle inside the fluid) is also determined to be the free surface particle, if the determination mentioned above only is carried out. FIG. 7 shows a result obtained by analyzing the fluid in a tank in accordance with the MPS method, the particle determined to be the particle on the free surface in accordance with the method mentioned above is indicated by ●, and the particle determined not to be a free-surface particle is indicated by ○. As it is apparent from this result, in the conventional interface determining method, there have been erroneous determinations that the free surface particle appears inside of the fluid.

CITATION LIST

[Patent Literature]
[PTL 1]: Japanese Unexamined Patent Application Publication No. H07.334484
[PTL 2]: Japanese Unexamined Patent Application Publication No. 2008-111675

SUMMARY OF INVENTION

The present invention has been made by taking the actual condition mentioned above into consideration, and the objective of the present invention is to accurately determine a particle positioned on a free surface (an interface) of a fluid or the like.

The present invention provides a method for determination of interface particles for determining particles positioned on an interface of a subject to be analyzed. The method for determination is used in a particle method in which the subject to be analyzed is expressed as an assembly of particles and motion of the particles is analyzed by calculations, including: a density acquiring step of obtaining density in a predetermined range based on a determining-target particle; a first discriminating step of comparing the density with a predetermined threshold; a second discriminating step of determining a symmetry of an arrangement of the other particles within a predetermined range based on the determining-target particle; and a determining step of determining the determining-target particle as an interface particle in the case that the density determined by the first discriminating step is found to be smaller than the predetermined threshold and the arrangement of the other particles determined by the second discriminating step is found to be asymmetrical.

In the determining method described above, the second discriminating step determines that the arrangement of the other particles is asymmetrical in the case that the sum of differences between a coordinate of the determining-target particle and a coordinate of each of the other particles within the predetermined range exceeds a predetermined threshold.

The present invention provides a device for determination of interface particles for determining particles positioned on an interface of a subject to be analyzed, the device for determination being used in a particle method in which the subject to be analyzed is expressed as an assembly of particles and motion of the particles is analyzed by calculations including: a density acquiring means for acquiring density in a predetermined range based on a determining-target particle; a first discriminating means for comparing the density with a predetermined threshold; a second discriminating means for determining a symmetry of an arrangement of the other particles within a predetermined range based on the determining-target particle; and a determining means for determining the determining-target particle as an interface particle in the case that the density determined by the first discriminating means is found to be smaller than the predetermined threshold and the arrangement of the other particles determined by the second discriminating means is found to be asymmetrical.

The present invention provides a program for determination of interface particles for causing a computer that carries out a process for determining particles positioned on an interface of a subject to be analyzed, in a particle method in which the subject to be analyzed is expressed as an assembly of particles and motion of the particles is analyzed by calculations, to function as: a density acquiring means for acquiring density in a predetermined range based on a determining-target particle; a first discriminating means for comparing the density with a predetermined threshold; a second discriminating means for determining a symmetry of an arrangement of the other particles within a predetermined range based on the determining-target particle; and a determining means for determining the determining-target particle as an interface particle in the case that the density determined by the first discriminating means is found to be smaller than the predetermined threshold and the arrangement of the other particles determined by the second discriminating means is found to be asymmetrical.

According to each of the configurations mentioned above, first of all, the density within the predetermined range based on the determining-target particle is acquired and is compared with a predetermined threshold. Further, the symmetry of the arrangement of the other particles within the predetermined range based on the determining-target particle is determined. Further, in the case that the density of the predetermined range based on of the determining-target particle is smaller than the predetermined threshold, and the arrangement of the other particles within the predetermined range based on the determining-target particle is asymmetric, the particles are determined to be positioned on the interface. It is possible to more accurately determine the interface particle by carrying out such a two-stage discrimination mentioned above.

DESCRIPTION OF EMBODIMENTS

Figure 1:
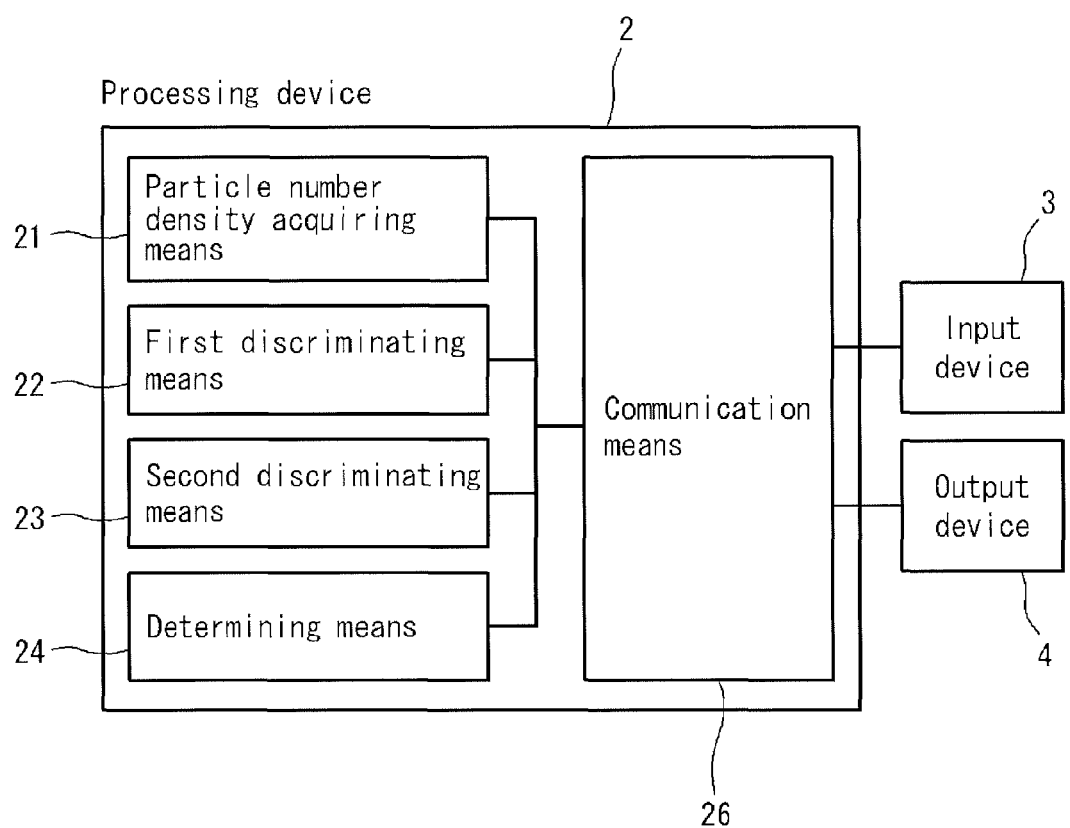
FIG. 1 is a schematic diagram showing a fluid analyzing device (a device for determination of free surface particles) according to an embodiment of the present invention.

FIG. 1 is a schematic diagram of a fluid analyzing device for analyzing a fluid by a particle method. The fluid analyzing device is configured by a processing device 2, an input device 3 and an output device 4. The processing device 2 is configured by a personal computer or the like provided with a CPU, a memory device including a RAM, a ROM, and an HDD, and an I/O interface. Further, the input device 3 is configured by a keyboard, a pointing device or the like, and is used for inputting various data such as a calculation condition, an initial condition of a particle and the like to the processing device 2. The inputted data is stored in the memory device of the processing device 2. The output device 4 is configured by a display, a printer and the like, and is used for outputting a result of processing by the processing device 2.

[Outline of Particle Method]

Figure 2:
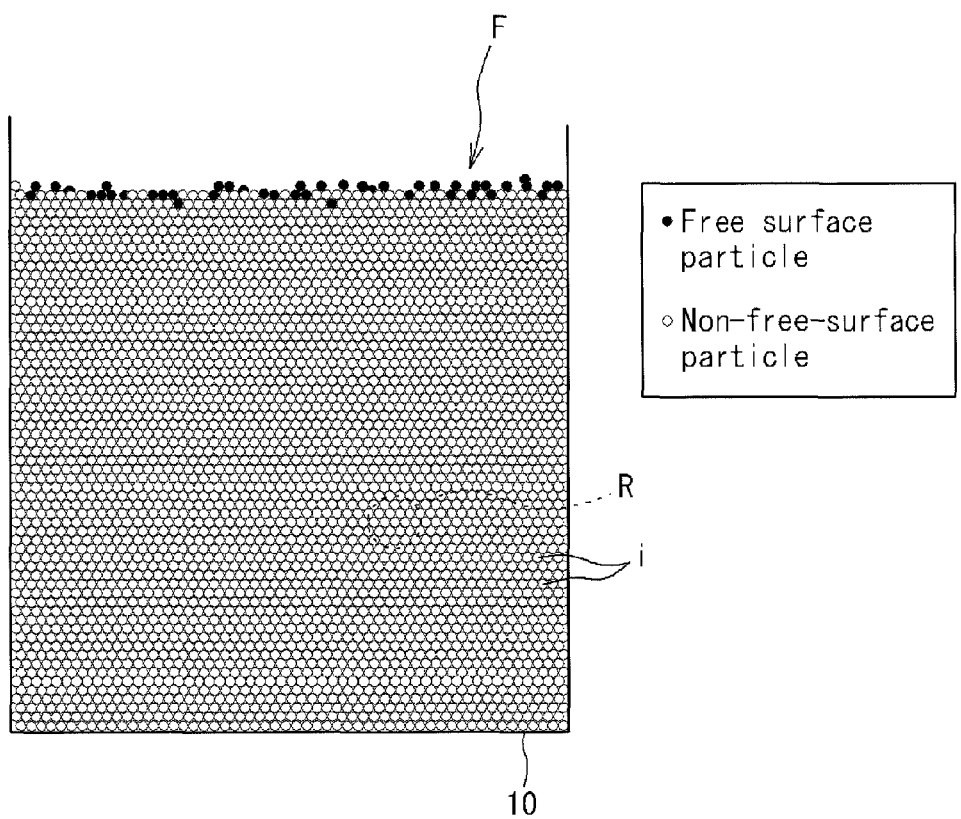
FIG. 2 is a view showing a result of determination by a method for determination of a free surface according to the embodiment of the present invention.

In the present embodiment, an analysis of a fluid in accordance with a particle method (MPS method) is executed by the processing device 2, assuming a model as shown in FIG. 2. In FIG. 2, an incompressible fluid F such as water is contained in an approximately rectangular tank 10, and the fluid F can be expressed as an assembly of particles i. Further, although not being illustrated, the tank 10 can be also expressed as an assembly of particles.

In the MPS method, data on physical properties such as density of a particle, a dynamic viscosity coefficient, data on an external force such as a gravitational acceleration, data on a distance between the particles in an initial arrangement, and data such as a reference radius (a reference range) for determining a particle number density mentioned below are inputted as initial values to the processing device 2. Further, in the processing device 2, the CPU executes a program installed in the memory device, so that the processing device 2 carries out a predetermined calculation by using the various inputted data and thereby updates a flow velocity and a position of the particle for each predetermined calculation time step.

Specifically, the flow velocity of the particle is calculated under conditions of an external force such as a gravitational force applied directly to the particle and flow velocity diffusion based on the viscosity of the fluid. Further, the position of the particle is calculated by using the flow velocity of the particle obtained by this calculation (a calculation in the first stage). The flow velocities and the positions obtained in this stage are tentative, and are corrected by a calculation in the subsequent second stage.

In the case of the incompressible fluid, the particle number density within a predetermined reference range is constant. However, if an individual particle moves corresponding to the tentative flow velocity obtained by the calculation in the first stage mentioned above, there is a case that a fluctuation is generated in the particle number density. Accordingly, in the MPS method, in order to homogenize particle arrangements, the tentative flow velocity and position are corrected by applying such a condition that the particle number density is constant (a calculation in the second stage). Specifically, the processing device 2 calculates a pressure correction value of the particle based on a difference between the particle number density of each of the particles and the fixed value of the particle number density, corrects the flow velocity of the particle by using the pressure correction value, and corrects the position of the particle by the corrected flow velocity. Further, as shown in FIG. 2, a condition of zero pressure is applied to the particle (the free surface particle; interface particle) positioned on an upper surface of the fluid F.

The MPS method traces the behavior of the fluid in a time progressive manner, by repeatedly carrying out the above processes. The method for analyzing the fluid using the MPS method is described in detail by PTL 1 and PTL 2 mentioned above, relevant documents and the like.

[Determining Method of Free Surface Particle]

Next, a description will be given of a method for determining the free surface particle positioned on the upper surface of the fluid F.

As shown in FIG. 1, the processing device 2 is structured such that the CPU executes the program installed in the memory device, thereby serving as the particle number density acquiring means 21, the first discriminating means 22, the second discriminating means 23, and the determining means 24.

Note that, FIG. 1 only shows the function portion relating to the determination of the free surface of the processing device 2, and the function relating to the behavior analysis of the fluid mentioned above is omitted.

A description will be given of an operation of each of the function portions 21 to 24 of the processing device 2 shown in FIG. 1, with reference to a flow chart in FIG. 5.

Figure 3:
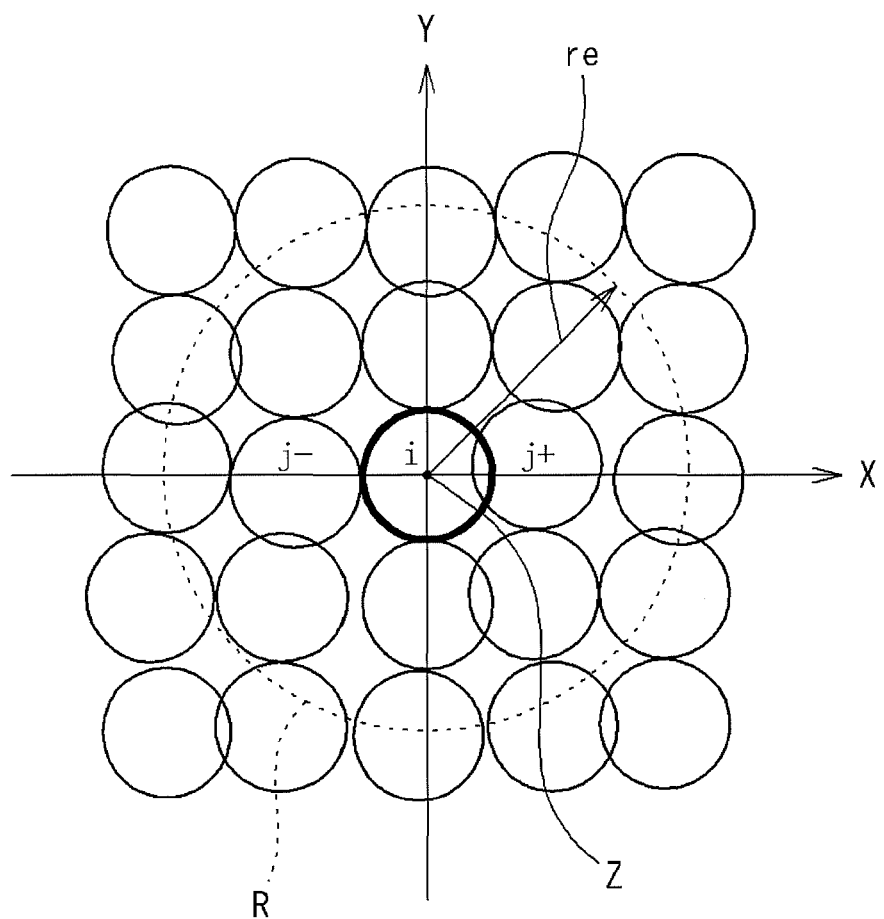
FIG. 3 is a view for explaining the method for determination of the free surface particles according to the embodiment of the present invention.
Figure 5:
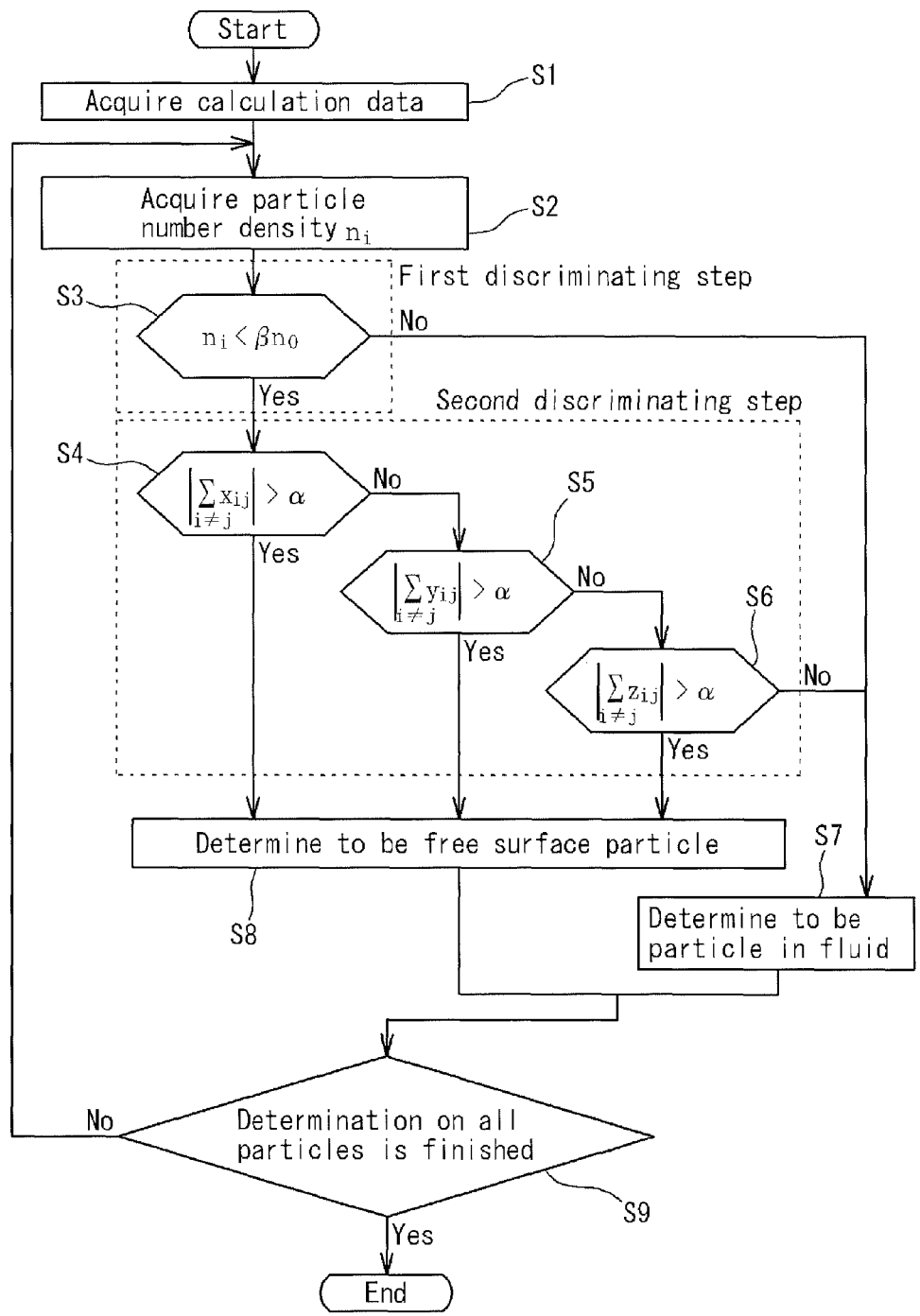
FIG. 5 is a flow chart showing procedures of the method for determination of the free surface particles according to the embodiment of the present invention.

In step S1 in FIG. 5, the particle number density acquiring means 21 serving as a function portion of the processing device 2 acquires the data used for calculating the particle number density. The data includes, for example, the density of the particle, the dynamic viscosity coefficient, and the reference radius for defining the reference range of the particle number density. As shown in FIG. 3, the reference radius $r_e$ is set to define a range in which one particle i interacts with the other particles. The reference radius is normally about 2 to 4 times of the particle diameter. A circular range within the reference radius $r_e$ is defined as a reference range R.

In step S2 in FIG. 5, the particle number density acquiring means 21 calculates the particle number density $n_i$ at the position of the particle i according to Equation (4) by using a weight function w in Equation (3-1) or (3-2). The particle number density $n_i$ is defined as a sum of the weight functions w of the other particles j with respect to the particle i.

$$w(r) = (r_e/r) - 1 \text{ (where, } 0 \leq r \leq r_e\text{)} \quad (3\text{-}1)$$

$$w(r) = 0 \text{ (where, } r_e \leq r\text{)} \quad (3\text{-}2)$$

where, r is a distance between particles, and $r_e$ is a reference radius (see FIG. 3).

[Math. 1]

$$n_i = \sum_{i \neq j} w(|r_j - r_i|) \quad (4)$$

where, $r_i$ is a position vector of the determining-target particle i, and $r_j$ is a position vector of the other particles j than the particle i within the reference range R.

Next, a process by the first discriminating means 22 is carried out in step S3. In the model as shown in FIG. 2, the first discriminating means 22 is structured such as to carry out a first stage determination whether or not the determining-target particle is the particle positioned on the upper surface of the fluid F, that is, the free surface particle.

In the case of the incompressible fluid, the particle number density based on the particle positioned in the fluid takes the fixed value $n_0$, however, since there are no other particles above the free surface particle, the particle number density $n_i$ based on the free surface particle becomes lower than the fixed value $n_0$. Accordingly, the first discriminating means 22 compares the particle number density $n_i$ with the fixed value $n_0$ and assumes that the particle i is the free surface particle in the case that the particle number density $n_i$ is smaller than a predetermined threshold. Specifically, a condition expressed by the following equation (5) is applied to the particle number density $n_i$.

$$n_i < \beta n_0 \quad (5)$$

where, β is a model constant for determining the free surface particle, and β=0.97 is, for example, given as a set value.

The first discriminating means 22 assumes the particle i as the free surface particle in the case that the particle number density $n_i$ at the position of the particle i satisfies the condition of Equation (5), and advances a process to step S4, and in the case that the condition of Equation (5) is not satisfied, it advances a process to step S7, and the determining means 24 (see FIG. 1) of the processing device 2 determines the particle i as the particle which is not positioned on the free surface (an inner fluid particle).

Processes of the steps S4 to S6 are carried out by the second discriminating means 23. The second discriminating means 23 applies a further determination condition to the particle i which is assumed as the free surface particle by the first discriminating means 22. Specifically, the second discriminating means 23 determines whether or not the other particles included in the reference range R based on the determining-target particle i are arranged with symmetry.

Since the first discriminating means 22 mentioned above simply compares the particle number density $n_i$ with the fixed value $n_0$, there is a possibility that it determines a determining-target particle as a free surface particle even in the case, for example, that the particle number density $n_i$ drops due to a thin state of particle positions in a uniform arrangement of particles within the reference range R. However, for the free surface particle, the particle number density $n_i$ drops because other particles do not exist above it, hence the other particles within the reference range R based on the free surface particle are arranged in an uneven manner instead of a uniform manner. Accordingly, the second discriminating means 23 determines the symmetry of the other particles based on the particle i for finding the non-uniformity of the other particles within the reference range R mentioned above.

A detailed description will be given below on the process of the second discriminating means 23 with reference to FIG. 3 and FIG. 4.

The arrangement of the other particles within the reference range R with the symmetry means an approximately uniform arrangement of the other particles around the determining-target particle within the reference range R. For example, paying attention to the other particles j– and j+ which are laterally adjacent to the particle i in FIG. 3, the other particles j– and j+ in both sides are arranged in opposite sides to each other at an approximately uniform distance with respect to the particle i. In this case, it can be said that these other particles j– and j+ are arranged symmetrically with respect to the particle i. On the contrary, in FIG. 4, the particle j– is adjacent to the particle i in one lateral side, but there is no particle in the position corresponding to the particle j– on the opposite side, thereby a clear gap is generated. In the case mentioned above, it can be said that the other particle j− is arranged in an asymmetrical state with respect to the particle i. The symmetry of the other particles j is determined by carrying out the discrimination mentioned above with regard to all the other particles j within the reference range R.

A specific determining method is as follows.

Figure 4:
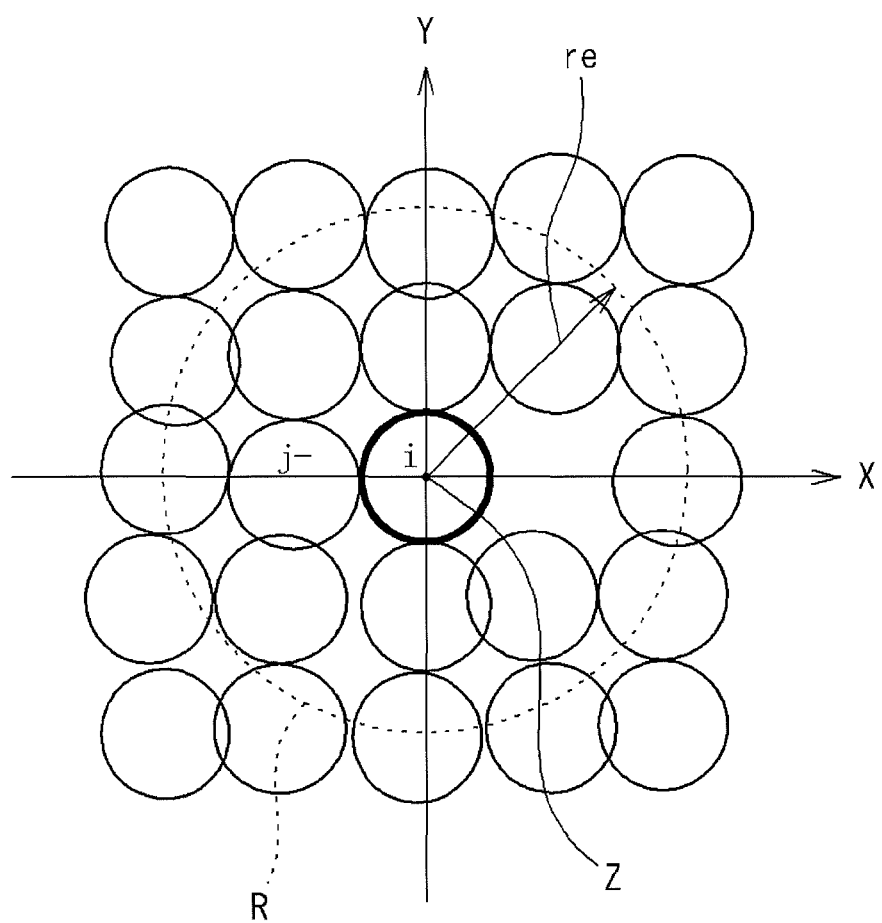
FIG. 4 is a view for explaining the method for determination of the free surface particles according to the embodiment of the present invention.

First of all, as shown in FIG. 3 and FIG. 4, an X-axis is set to the reference range R based on the determining-target particle i. In this case, the X-axis is taken to be an axis passing through the center of the particle i in a lateral direction. Further, a coordinate relevant to the X-axis is obtained with respect to all the particles within the reference range R, and a difference $x_{ij}$ between a coordinate $x_i$ of the determining-target particle i and a coordinate $x_j$ of each of the other particles j is determined by Equation (6).

$$x_{ij} = x_j - x_i \quad (6)$$

The difference $x_{ij}$ between the coordinate $x_i$ of the determining-target particle i and the coordinate $x_j$ of each of the other particles j is expressed by the distance between the particles i and j relevant to the X-axis, with a sign + or − attached thereto.

Next, an absolute value of a sum of the difference $x_{ij}$ of coordinate between the determining-target particle i and each of the other particles j within the reference range R is compared with a predetermined threshold a according to Equation (7).

[Math. 2]

$$\left| \sum_{i \neq j} x_{ij} \right| > \alpha \quad (\text{where}, \alpha > 0) \quad (7)$$

In the case that Equation (7) is not satisfied, it can be said that the other particles j are arranged with symmetry with respect to the X-axis, based on the determining-target particle i to be determined. For example, in FIG. 3, when the coordinates of the other particles j− and j+ which are arranged symmetrically to each other based on the particle i are −a and +a, respectively, with the particle i as the origin, the signed values of the distances $x_{ij}$ for the other particles j− and j+ are −a and +a, respectively, and the values cancel each other to come to zero in total, which is smaller than the threshold α.

On the contrary, if the other particles j are arranged asymmetrically with respect to the X-axis based on the determining-target particle i, the distances $x_{ij}$ of the other particles j with respect to the determining-target particle i do not cancel each other, creating a difference. Further, if the difference is larger than α, it satisfies Equation (7), and it is determined that the arrangement of the other particles j is asymmetric.

In step S4 in FIG. 5, the second discriminating means 23 advances a process to step S5 in the case that the sum of the differences $x_{ij}$ of coordinate between the determining-target particle i and each of the other particles j within the reference range R is determined to be smaller than the threshold α, and advances a process to step S8 in the case that the sum of the differences $x_{ij}$ is larger than the threshold α.

Further, in step S8, since the other particles j within the reference range R are not arranged with symmetry with respect to the X-axis (being asymmetrical), the determining means 24 (see FIG. 1) of the processing device 2 conclusively determines that the determining-target particle i is a particle positioned on the free surface.

On the other hand, in step S5, a Y-axis is set with respect to the reference range R, and the same calculation as mentioned above is carried out with respect to the coordinates $y_i$ and $y_j$ of the particle i and the other particles j, respectively. The calculation is carried out because the other particles j within the reference range R, even though they are determined to be arranged with symmetry with respect to the X-axis in step S4, are not necessarily arranged with symmetry with respect to the other directions than the X-axis. Accordingly, in step S5, the same determination as mentioned above is made with respect to the Y-axis which intersects the X-axis, and the same determination as mentioned above is made also with respect to a Z-axis which intersects the X-axis and the Y-axis, in step S6 mentioned below.

In step S5, first, the difference $y_{ij}$ between the coordinate $y_i$ of the determining-target particle i and the coordinate $y_j$ of each of the other particles j is obtained according to Equation (8), and an absolute value of a sum of the differences $y_{ij}$ of coordinate between the particle i and each of the other particles j is further compared with the predetermined threshold a according to Equation (9).

[Math. 3]

$$y_{ij} = y_j - y_i \quad (8)$$

$$\left| \sum_{i \neq j} y_{ij} \right| > \alpha \quad (\text{where}, \alpha > 0) \quad (9)$$

The second discriminating means 23 advances the process to step S6 in the case that the sum of the differences $y_{ij}$ is smaller than the threshold α, and advances the process to step S8 in the case that the sum of the differences $y_{ij}$ is larger than the threshold α. Further, in step S8, the determining means 24 of the processing device 2 conclusively determines that the particle i is a particle which is positioned on the free surface.

In step S6, the Z-axis is set with respect to the reference range R, and the same calculation as mentioned above is carried out with respect to coordinates $z_i$ and $z_j$ of the particle i and the other particles j, respectively.

In other words, a difference $z_{ij}$ between the coordinate $z_i$ of the determining-target particle i and the coordinate $z_j$ of each of the other particles j is obtained according to Equation (10), and an absolute value of a sum of the differences $z_{ij}$ of coordinate between the particle i and each of the other particles j is compared with the predetermined threshold a according to Equation (11).

[Math. 4]

$$z_{ij} = z_j - z_i \quad (10)$$

$$\left| \sum_{i \neq j} z_{ij} \right| > \alpha \quad (\text{where}, \alpha > 0) \quad (11)$$

The processing device 2 advances the process to step S7 in the case that the sum of the differences $z_{ij}$ is determined to be smaller than the threshold α, and advances the process to step S8 in the case that the sum of the differences $z_{ij}$ is determined to be larger than the threshold α, by the second discriminating means 23.

Further, the determining means 24 of the processing device 2 determines in step S7 that the particle i is the particle which is not positioned on the free surface, and conclusively determines in step S8 that the particle i is a particle which is positioned on the free surface.

Next, in step S9, the processing device 2 determines whether or not the determination is finished with respect to all the particles of the fluid F, and then returns to step S2 in the case that the determination is not finished or terminates the determining process of the free surface particle in the case that the determination is finished. The result of analysis of the behavior of the fluid F reflecting the result of determination of the free surface particle can be outputted to the output device 4 such as a monitor via a communication means 26.

The process described above shows the case that the fluid is analyzed in the three-dimensional field (the XYZ coordinate), however, step S6 in FIG. 5 can be omitted in the case of an analysis in a two-dimensional field (an XY coordinate).

Figure 7:
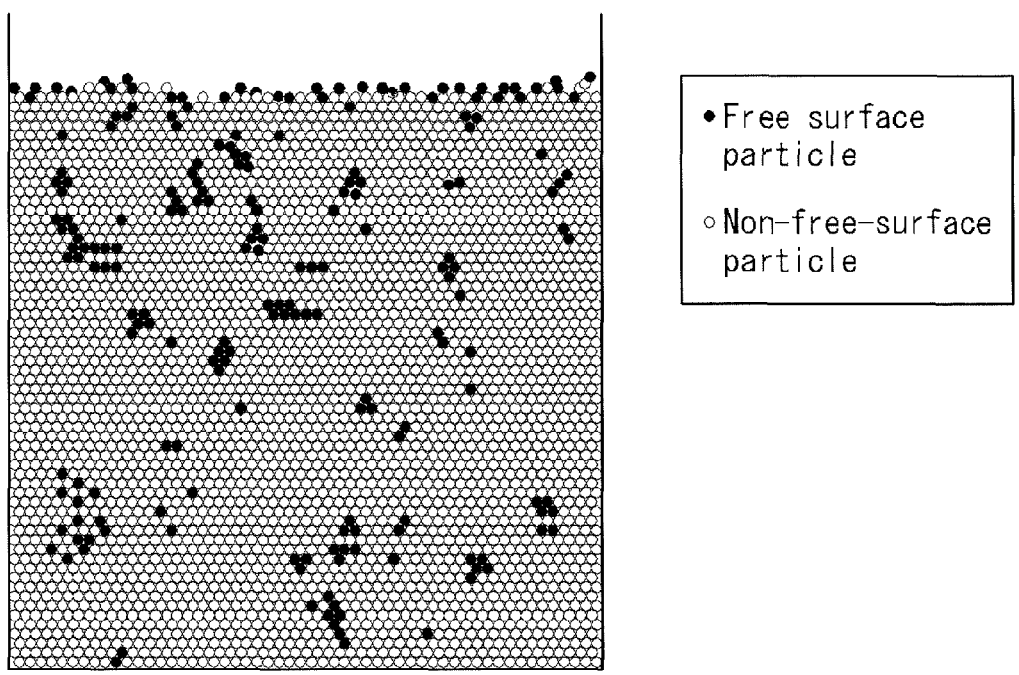
FIG. 7 is a view showing a result of determination by a conventional method for determination of free surface particles.

As mentioned above, in the present embodiment, a two-stage-determining method is used for determining whether or not a determining-target particle is the free surface particle, whereby it is possible to accurately determine the free surface particle. In FIG. 2, the free surface particle indicated by ● appears only on the upper surface of the fluid F, and does not appear in the fluid F. Accordingly, by the determining method of the present invention, the free surface particle can be more accurately determined, compared with the result of determination (FIG. 7) by the conventional MPS method.

FIG. 2 shows the result of analysis on the fluid in a static state. On the other hand, the analysis has been carried out under the following condition, for indicating the applicability to the fluid in the dynamic state.

Figure 6A:
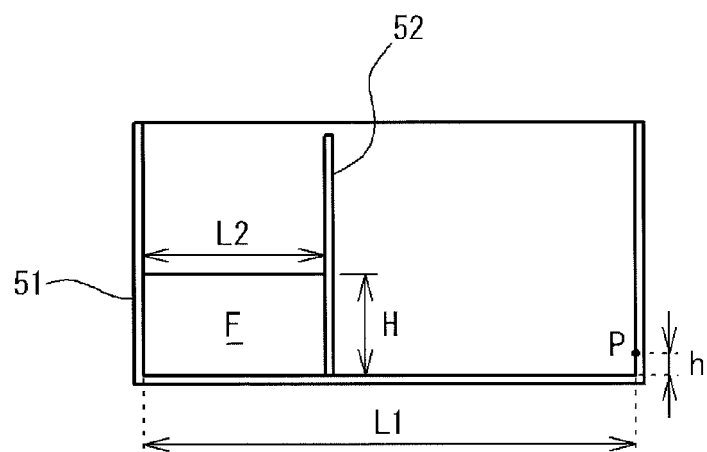
FIG. 6A is a view showing a simulation model indicating an applicability of the method for determination of the free surface particles according to the embodiment of the present invention to a fluid in a dynamic state.

As shown in FIG. 6A, there is assumed such a model in which a support plate 52 is set up in a tank 51, and the fluid F is contained in a space surrounded by the tank 51 and the support plate 52. Then, a behavior of the fluid F at the time of removing the support plate 52 was analyzed, and a pressure at a fixed observation point P on a wall surface of the tank 51 with which the fluid F comes into collision was determined in time sequence. In this case, set dimensions of the model were set to L1=3.22 m, L2=1.20 m, H=0.60 m and h=0.16 m. As the fluid F, water was used.

In the above analysis, the free surface determining method according to the present invention was applied to a version of SPH method, namely, Modified ISPH method, to which the same improvement as that in the CMPS method (for example, refer to Coastal Engineering Journal, Vol. 50, No. 2 (2008)) corresponding to a high precision particle method guaranteeing a momentum conservation property is applied. The result of analysis is shown in a graph in FIG. 6B.

Figure 6B:
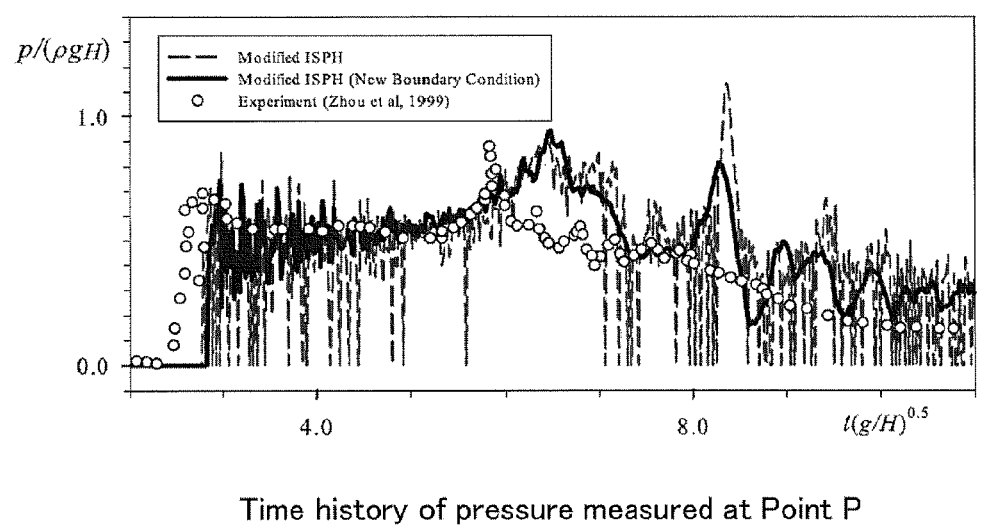
FIG. 6B is a graph showing a result of analysis.

In FIG. 6B, the horizontal axis indicates a time t, and the vertical axis indicates a pressure p. The circles in the graph (Experiment) indicate the experimental values obtained in an existing experiment, a broken line indicates a result of analysis in the case that the determining method according to the present invention is not applied, and the solid line indicates a result of analysis in the case that the determining method according to the present invention is applied.

As shown by the broken line, in the case that the determining method according to the present invention is not applied, a spike noise at which the pressure value drops to zero is frequently generated. On the contrary, in the case that the determining method according to the present invention is applied (the solid line), a noise at which the pressure value drops to zero is not generated. Further, although a vertically larger fluctuation is somewhat seen, the pressure value fluctuates in such a manner as to substantially correspond to the experimental value.

The present invention can be appropriately changed in design without being limited to the embodiment mentioned above. For example, the reference range R used in the first discriminating means 22 mentioned above is not always the same as the reference range R used in the second discriminating means 23. Further, it is possible to reverse the orders of the first discriminating step and the second discriminating step.

The determining method of the free surface particle according to the present invention can be applied not only to the MPS method but also to the other methods (for example, an SPH-based method, a DEM-based method used for analyzing the behavior of pulverulent material and the like) in which the determination of the interface of the fluid or the like is required. Further, the present invention can be used as an interface determining method of polyphase fluid such as two phases or three phases, without being limited to a single-phase fluid or the like.

The invention claimed is:

1. A method for determination of interface particles for determining particles positioned on an interface of a subject to be analyzed, the method for determination being used in a particle method in which the subject to be analyzed is expressed as an assembly of particles and motion of the particles is analyzed by calculations, comprising:
    a density acquiring step of acquiring density in a predetermined range based on a determining-target particle;
    a first discriminating step of comparing the density with a predetermined threshold;
    a second discriminating step of determining a symmetry of an arrangement of the other particles within a single predetermined range based on the determining-target particle; and
    a determining step of determining the determining-target particle as an interface article in the case that the density determined by the first discriminating step is found to be smaller than the predetermined threshold and the arrangement of the other particles determined by the second discriminating step is found to be asymmetrical, wherein
    the second discriminating step determines that the arrangement of the other particles is asymmetrical in the case that a sum of differences between a coordinate of the determining-target particle and a coordinate of each of the other particles within the single predetermined range exceeds a predetermined threshold.

2. A device for determination of interface particles for determining particles positioned on an interface of a subject to be analyzed, the device for determination being used in a particle method in which the subject to be analyzed is expressed as an assembly of particles and motion of the particles is analyzed by calculations, comprising:
    a density acquiring means for acquiring density in a predetermined range based on a determining-target particle;
    a first discriminating means for comparing the density with a predetermined threshold;
    a second discriminating means for determining a symmetry of an arrangement of the other particles within a single predetermined range based on the determining-target particle; and
    a determining means for determining the determining-target particle as an interface particle in the case that the density determined by the first discriminating means is found to be smaller than the predetermined threshold and the arrangement of the other particles determined by the second discriminating means is found to be asymmetrical,
    wherein the second determining means determines that the arrangement of the other particles is asymmetrical in the case that a sum of differences between a coordinate of the determining-target particle and a coordinate of each of the other particles within the single predetermined range exceeds a predetermined threshold.

3. A computer readable media storing a computer program in a non-transitory way for determination of interface particles for causing a computer that carries out a process for determining particles positioned on an interface of a subject to be analyzed, in a particle method in which the subject to be analyzed is expressed as an assembly of particles and motion of the particles is analyzed by calculations, to function as:
   a density acquiring means for acquiring density in a predetermined range based on a determining-target particle;
   a first discriminating means for comparing the density with a predetermined threshold;
   a second discriminating means for determining a symmetry of an arrangement of the other particles within a single predetermined range based on the determining-target particle; and
   a determining means for determining the determining-target particle as an interface particle in the case that the density determined by the first discriminating means is found to be smaller than the predetermined threshold and the arrangement of the other particles determined by the second discriminating means is found to be asymmetrical,
   wherein the second discriminating means determines that the arrangement of the other particles is asymmetrical in the case that a sum of differences between a coordinate of the determining-target particle and a coordinate of each of the other particles within the single predetermined range exceeds a predetermined threshold.

\* \* \* \* \*